(12) United States Patent
Matsusaka et al.

(10) Patent No.: US 6,634,381 B2
(45) Date of Patent: Oct. 21, 2003

(54) SOLENOID VALVE DEVICE AND ITS MANUFACTURING METHOD

(75) Inventors: Noboru Matsusaka, Kariya (JP); Motoyoshi Ando, Nagoya (JP); Kazutoshi Iwasaki, Nagoya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/956,810

(22) Filed: Sep. 21, 2001

(65) Prior Publication Data

US 2002/0038670 A1 Apr. 4, 2002

(30) Foreign Application Priority Data

Oct. 4, 2000 (JP) ........................ 2000-304926
Jul. 27, 2001 (JP) ........................ 2001-227199

(51) Int. Cl.[7] ............................ F15B 13/044
(52) U.S. Cl. ................................ 137/625.65
(58) Field of Search ..................... 137/625.65

(56) References Cited

U.S. PATENT DOCUMENTS 3,661,183 A * 5/1972 Komaroff et al. ...... 137/625.65
5,829,396 A * 11/1998 Sturman et al. ........ 137/625.65
5,878,782 A * 3/1999 Nakajima .............. 137/625.65
5,906,351 A * 5/1999 Aardema et al. ....... 137/625.65
6,367,434 B1 * 4/2002 Steigerwald et al. ... 137/625.65
6,453,947 B1 * 9/2002 Inoue et al. ........... 137/625.65

FOREIGN PATENT DOCUMENTS

JP        11-148575      6/1999
JP         7-293729     11/1999

* cited by examiner

*Primary Examiner*—Gerald A. Michalsky
(74) *Attorney, Agent, or Firm*—Nixon & Vanderhye PC

(57) ABSTRACT

A solenoid valve device controls a driving force generated by a linear solenoid (electromagnetic driving portion), for pressing a spool away from the linear solenoid by controlling a current supplied to a coil, and ultimately adjusting an oil pressure flowing from an outlet port. As current supplied to the coil increases, the outlet port oil pressure decreases. An outside diameter of a tube portion of a valve housing is equal to or larger than an outside diameter r1 of the linear solenoid (r2≧r1) and a flange of the valve housing, permitting the entire solenoid valve device to be disposed within a cylindrical reception hole provided in a hydraulic control apparatus body of an automatic gear, for example. A method of manufacturing the solenoid valve device is also disclosed.

17 Claims, 7 Drawing Sheets

SOLENOID VALVE DEVICE AND ITS MANUFACTURING METHOD

CROSS REFERENCE TO RELATED APPLICATION

This application is based on and incorporates herein by reference Japanese Patent Application No. 2000-304926 filed on Oct. 4, 2000, and Japanese Patent Application No. 2001-227199 filed on Jul. 27, 2001.

BACKGROUND OF THE INVENTION

1. Field of the Invention

The present invention relates to a solenoid valve device for controlling openings provided in a tubular portion of a valve housing by displacing a valve member in the tubular portion using a driving force provided by an electromagnetic driving mechanism.

2. Description of Related Art

In JP-A-7-293729, the following solenoid valve device is disclosed. In the solenoid valve device, a spool as a valve member is disposed in a valve housing formed in a circular tube shape in a state where the spool can reciprocate in the valve housing. The spool is displaced by a driving force generated at an electromagnetic driving portion, thereby controlling a communication state among openings provided on a peripheral wall of the valve housing.

In the conventional solenoid valve device disclosed in JP-A-7-293729, as shown in FIG. 11, an outer diameter of an electromagnetic driving portion 101 of a solenoid valve device 100 is larger than an outer diameter of a valve housing 110. When this solenoid valve device 100 is used as a hydraulic control valve for controlling the oil pressure of an oil supplied to a hydraulic control apparatus of an automatic gear of a vehicle, the electromagnetic driving portion 101 protrudes from a body 120 of the hydraulic control apparatus. Since it is feared that the electromagnetic driving portion 101 may interfere with components around the body 120, it is desired to mount the solenoid valve device 100 in the body 120. Although the solenoid valve device 100 is prevented from interfering with other components by changing a mounting direction of the solenoid valve device 100, it is feared that the body 120, in which the solenoid valve device 100 is disposed, is required to be thick to accommodate the mounting direction of the solenoid valve device 100. If a step-shaped hole is provided in the body 120, the entire solenoid valve device 100 can be disposed within the body 120. However, this increases the number of manufacturing processes to be performed on the body 120.

The electromagnetic driving portion 101 is connected to the valve housing 110 by crimping a flange provided on the valve housing at a side of the electromagnetic driving portion 101. Since the outer diameter of the flange is larger than the outer diameter of the tube portion of the valve housing 110, when the valve housing 120 is formed by cutting, it is required to begin with a base material considerably larger in diameter than the outer diameter of the tube portion, thereby increasing the amount of material to be removed.

Therefore, in order to produce a device that does not physically interfere with other components, it has been proposed to reduce the overall diameter of such a device to eliminate the solenoid valve device 100 on the outside of the body 120, such as the solenoid valve device 100 shown in FIG. 11, or reduce the outside diameter of the electromagnetic driving portion 101 in order to incorporate the electromagnetic driving portion 101 within the valve housing 110.

SUMMARY OF THE INVENTION

Thus, it is a first object of the present invention to provide a solenoid valve that can be readily mounted without interfering with other components and a method of manufacturing the solenoid valve. A second object of the present invention is to provide a solenoid valve device which can be readily machined and its manufacturing machining method.

To achieve the objective of the present invention, there is provided a solenoid valve device with an electromagnetic driving portion having an outside diameter substantially equal to or smaller than an outside diameter of a tubular portion of a valve housing. Since the entire solenoid valve device can be disposed within a cylindrical reception hole, the solenoid valve device can be prevented from interfering with other components. Additionally, the number of machining steps to produce the reception hole can be reduced.

The outer diameter of the electromagnetic driving portion can be slightly larger than the outer diameter of the tubular portion of the valve housing as long as any contained fluid is prevented from leaking through the clearance between the valve housing and an inner wall defining the cylindrical reception hole when the solenoid valve device is disposed within the cylindrical reception hole. An outer diameter of the flange of the valve housing is equal to or smaller than an outer diameter of the tube portion of the valve housing. Accordingly, the amount of material to be removed is decreased when the valve housing is formed by cutting a base material of reduced diameter when the electromagnetic driving portion is made no larger than the diameter of the valve housing. Further, the valve housing can be machined by through-feed cutting, thereby decreasing the cutting time of the valve housing.

In a method of producing the solenoid valve according to the present invention, the valve housing includes an annular recess portion on its peripheral wall. Accordingly, when a crimping tool approaches the yoke, located at a periphery of the flange, to crimp the yoke to the flange in a direction perpendicular to a longitudinal direction of the tube portion, the crimping tool protrudes into the annular recess portion without making contact with the valve housing. Additionally, at least one notch is provided on the open end of the yoke around a circumference of the yoke. Accordingly, deformation of the yoke, generated at a time of crimping the open end of the yoke, is absorbed into the notch, thereby preventing the yoke from being deformed. Additionally, at least one recess portion is provided on the circumferential portion of the flange. Further, this deformed portion at the open end of the yoke is entered into the recess portion, thereby preventing the yoke from being rotated relative to the valve housing.

The invention, together with additional objectives, features and advantages thereof, will be best understood from the following description, the appended claims and the accompanying drawings in which:

The embodiments of the present invention will be described with reference to the accompanying drawings.

Figure 1:
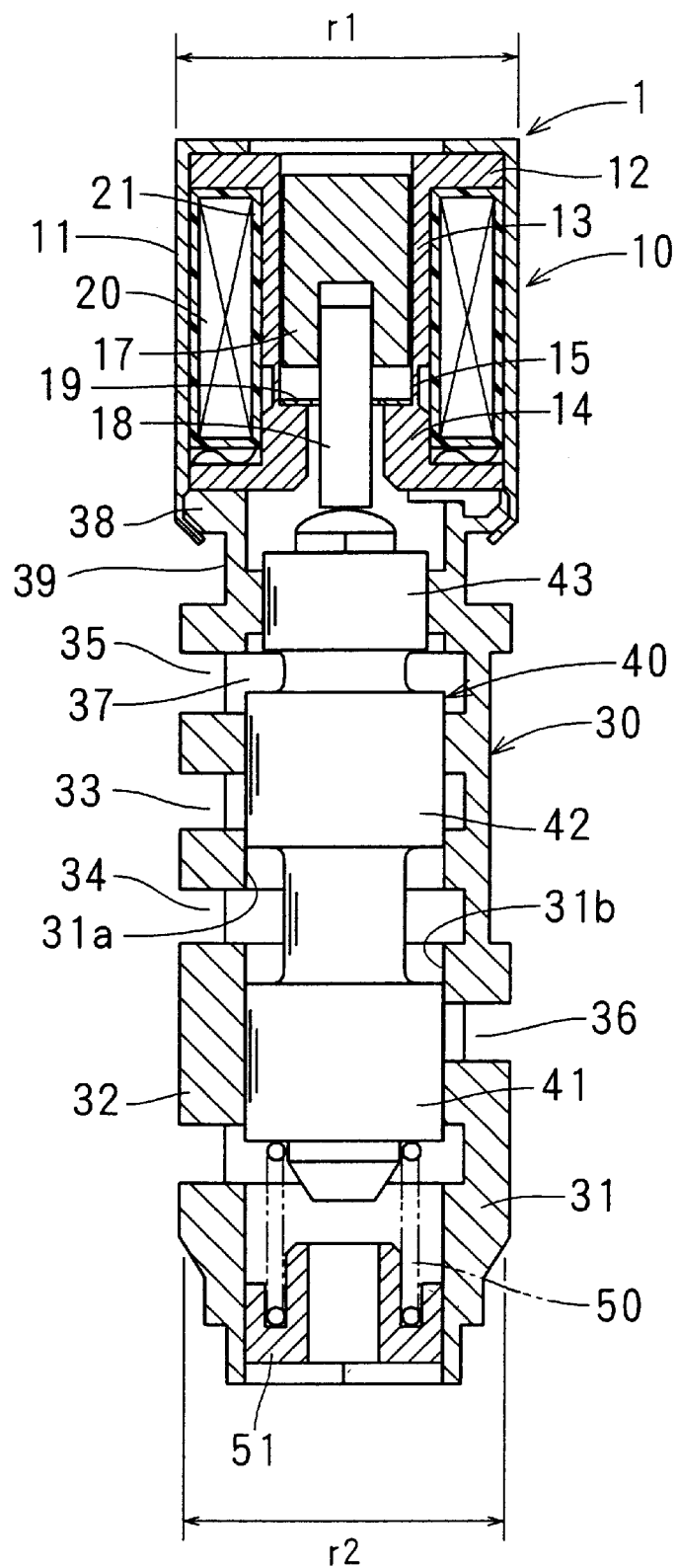
FIG. 1 is a cross-sectional view showing a solenoid valve device according to a first embodiment of the present invention.
Figure 2:
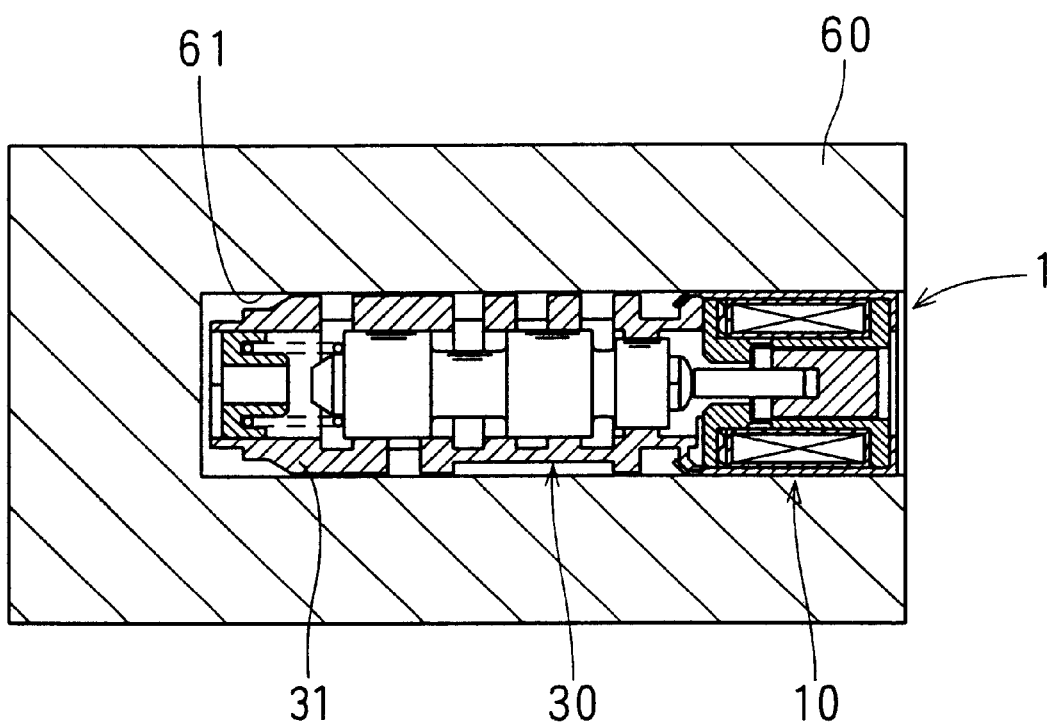
FIG. 2 is a schematic cross-sectional view showing the solenoid valve device of the first embodiment disposed within a body of a hydraulic control apparatus of an automatic gear.

FIGS. 1 and 2 show a solenoid valve device according to a first embodiment of the present invention. In FIG. 2, a solenoid valve device 1 is a spool-type hydraulic control valve for controlling the oil pressure supplied to a hydraulic control apparatus of an automatic gear of a vehicle. A cylindrical reception hole 61 is provided in a body 60 of the hydraulic control apparatus. Additionally, FIGS. 1 and 2 show the solenoid valve device 1 with a linear solenoid 10 as an electromagnetic driving portion and a spool control valve 30 as a valve portion. FIG. 1 shows a yoke 11 of the linear solenoid 10 connected to the spool control valve 30 by crimping an end of the yoke 11 to a flange 38 of a valve housing 31.

The linear solenoid 10 includes the cylindrical shaped yoke 11, a stator core 12, a plunger 17, a shaft 18, and a coil 20. The yoke 11 and the stator core 12 constitute a stator. The yoke 11, the stator core 12, and the plunger 17 are comprised of a magnetic material because they constitute a magnetic circuit.

The end of the yoke 11 is crimped to the valve housing 31 which supports a spool 40 in a way to permit the spool 40 to freely reciprocate in the valve housing 31, while the stator core 12 is fixed between the yoke 11 and the valve housing 31. The stator core 12 includes a reception portion 13, an attracting portion 14 and a thin wall portion 15 for connecting the reception portion 13 and the attracting portion 14, since they are integrally formed. The thin wall portion 15 is a magnetic resistance portion for preventing magnetic flux from leaking between the reception portion 13 and the attracting portion 14.

The reception portion 13 supports the plunger 17 in a state where the plunger 17 can reciprocate in the reception portion 13. A thin film of a non-magnetic material such as nickel and phosphorus is formed by plating on at least any one of an inner wall surface of the reception portion 13 and an outer wall surface of the plunger 17 for increasing magnetic attraction by reducing, as small as possible, a clearance between them. The plunger 17 is supported by a cup formed by a non-magnetic material.

When the coil 20 is energized, magnetic attraction for attracting the plunger 17 is generated between the attracting portion 14 and the plunger 17. A stopper 19, formed by a non-magnetic material, is disposed on an end surface of the attracting portion 14 facing the plunger 17 in its axial direction. One end of the shaft 18 is press-fitted into the plunger 17, and the other end of the shaft 18 makes contact with one end of the spool 40.

The coil 20 is wound around a resin bobbin 21. When a current is supplied to the coil 20 from a terminal (not shown) electrically connected to the coil 20, magnetic flux flows in a magnetic circuit formed by the yoke 11, the reception portion 13, attracting portion 14 and the plunger 17, and magnetic attraction is generated between the attracting portion 14 and the plunger 17. Then, the plunger 17 and the shaft 18 move toward the valve housing 31 (downward in FIG. 1). The downward movement of the plunger 17 in FIG. 1 is restricted by stopper 19. Terminals (not shown) are disposed on an outer surface of the yoke 11 on the linear solenoid 10.

The spool control valve 30 includes the valve housing 31, the spool 40 and a spring 50 as a means for urging the spool 40 with respect to the shaft 18. Movement of the plunger 17 is transmitted to the spool 40 through the shaft 18, and the spool 40 reciprocates in the valve housing 31.

The valve housing 31 includes a tube portion 32 and flange 38, and it supports the spool 40 in such a way so that the spool 40 can reciprocate. A peripheral wall surface of the valve housing 31 defines an annular recess portion 39 next to the flange 38. An inlet port 33, an outlet port 34, a feedback port 35 and a discharge port 36 are provided in the tube portion 32, formed in a circular tube shape, as openings through which an inside of the tube portion 32 communicates with an outside of the tube portion. Typically, a working oil flows into the inlet port 33 from an oil tank (not shown) using a pump, and it is supplied to an engagement device of an automatic gear (not shown) through the outlet port 34. The outlet port 34 communicates with the feedback port 35 outside the solenoid valve device 1, and a portion of a working oil flowing out from the outlet port 34 is introduced into the feedback port 35. A feedback chamber 37 communicates with the feedback port 35. A working oil is discharged to the oil tank through the discharge port 36. In the spool 40, a large diameter land 41, a large diameter land 42 and a small diameter land 43 are provided from an opposite side of the linear solenoid 10 in this order. An outside diameter of the small diameter land 43 is smaller than that of the large diameter lands 41 and 42.

The feedback chamber 37 is provided between the large diameter land 42 and the small diameter land 43. An oil pressure of a working oil fed back through the feedback chamber 37 acts on the large diameter land 42 and the small diameter land 43, and working areas of the oil pressure are different from each other due to a difference between the outer diameters of both lands 42 and 43. Therefore, the oil pressure in the feedback chamber 37 presses the spool 40 away from the linear solenoid 10. In the solenoid valve device 1, a part of an output working oil is fed back for preventing an output oil pressure from fluctuating due to fluctuation of an input oil pressure from the supplied working oil. The spool 40 is stopped at a position where an urged force of the spring 50, a driving force of the shaft 18 for pressing the spool 40, and a reception force of the spool 40 from an oil pressure in the feedback chamber 37, are balanced. Here, the plunger 17 is attracted to the attracting portion 14 by energizing the coil 20, so that this driving force is generated. The spring 50, provided at a spool end opposite the linear solenoid valve 10, urges the spool 40 toward the linear solenoid 10. The load supplied by the spring 50 can be adjusted by turning an adjusting screw 51.

An amount of a working oil flowing from the inlet port 33 to the outlet port 34 is determined by a sealing length of an overlapped portion between an inner wall 31a of the valve housing 31 and an outer wall of the large diameter land 42. A small sealing length increases an amount of a working oil flowing from the inlet port 33 to the outlet port 34, and a large sealing length decreases the amount. Similarly, an amount of a working oil flowing from the outlet port 34 to the discharge port 36 is determined by a sealing length of an overlapped portion between the inner wall 31b of the valve housing 31 and an outer wall of the large diameter land 41.

As shown in FIG. 1, an outer diameter r2 of the tube portion 32 of the valve housing 31 is equal to or larger than an outer diameter r1 of the yoke 11 (r2≧r1). With reference to FIG. 2, when the solenoid valve device 1 is disposed in the cylindrical reception hole 61, a working oil does not leak through the clearance between the valve housing 31 and an inner wall defining the cylindrical reception hole 61 provided in a body 60 of the hydraulic control apparatus when that clearance is about 10 μm. That is, with reference to FIG. 1, the outside diameter r1 is allowed to be larger than the outside diameter r2 by about 20 μm. The outer diameter of the flange 38 of the valve housing 31 is equal to or smaller than the outside diameter r2 of the tube portion 32.

Figure 4:
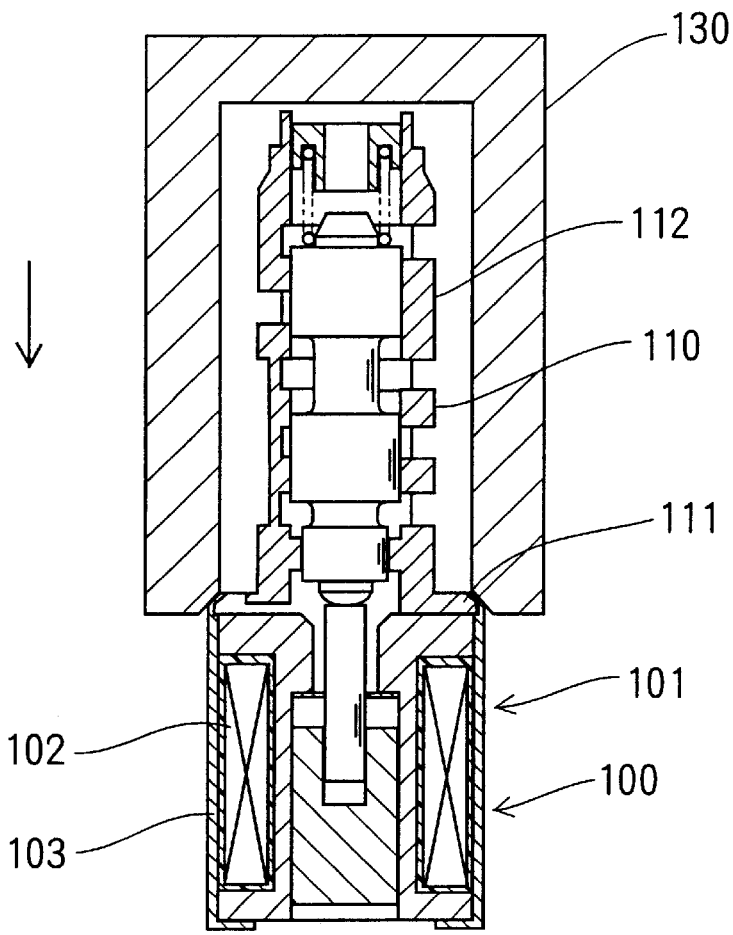
FIG. 4 is a cross-sectional view showing a crimping process of a conventional solenoid valve device.
Figure 11:
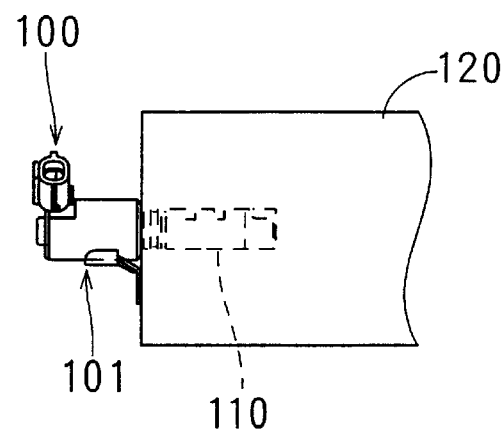
FIG. 11 is a schematic view showing a conventional solenoid valve device disposed within a body of a hydraulic control apparatus of an automatic gear.

With reference to FIG. 4, in the conventional solenoid valve device 100 described above, an outer diameter of the electromagnetic driving portion 101 is larger than an outer diameter of the valve housing 110, and an outer diameter of the flange 111 of the valve housing 110 is larger than an outer diameter of the tube portion 112 of the valve housing 110. Therefore, the valve housing 110 is inserted in its longitudinal direction into a cylindrical crimping tool 130, and an open end of the yoke 103 covering a periphery of the coil 102 is crimped to the flange 111 by the cylindrical crimping tool 130. The arrow shown in FIG. 4 indicates the insertion direction of the cylindrical crimping tool relative to the valve housing 110.

Figure 3A:
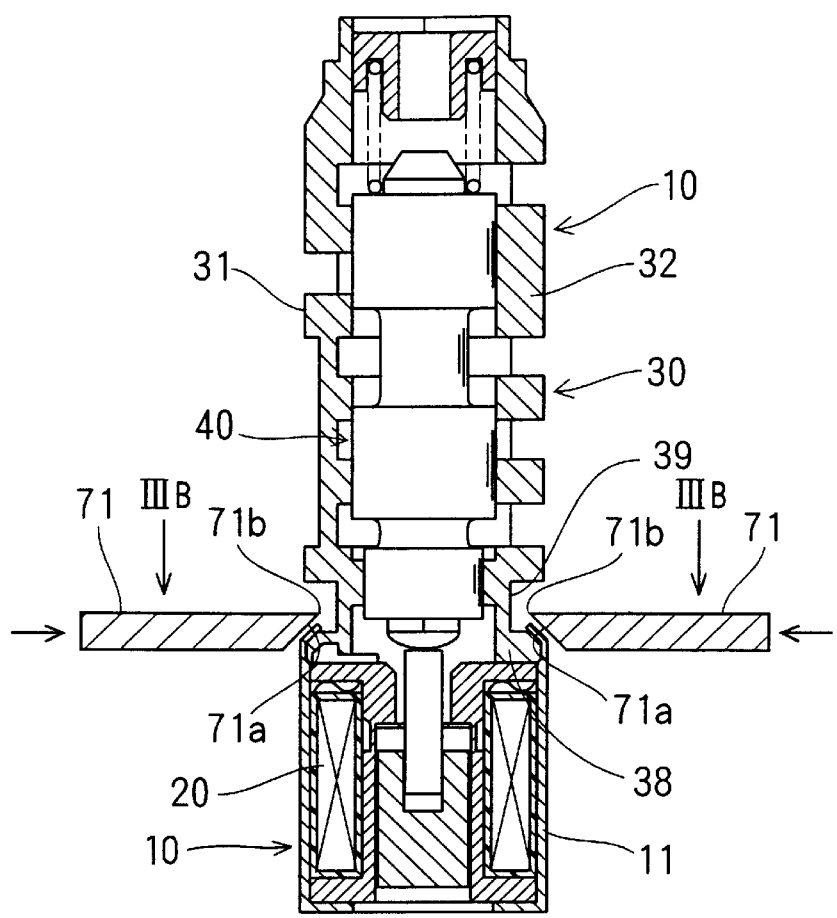
FIG. 3A is a cross-sectional view showing a crimping process of the solenoid valve device of the first embodiment.
Figure 3B:
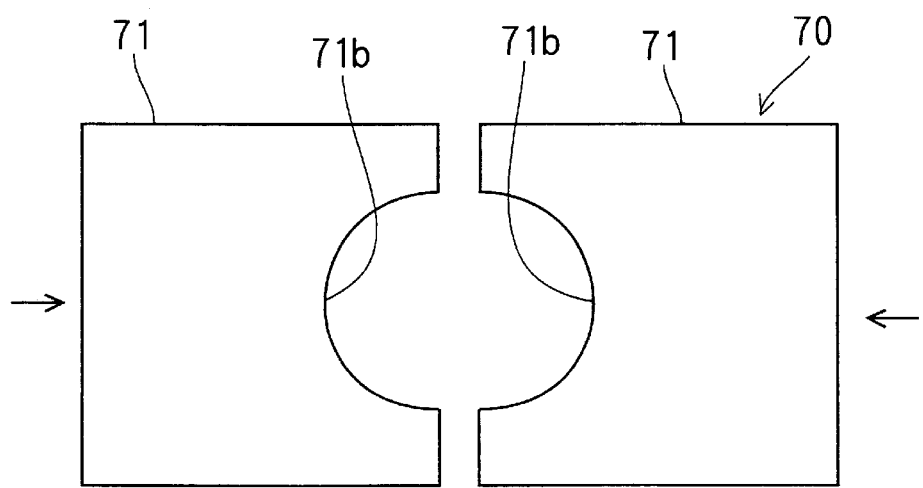
FIG. 3B is a plan view showing a crimping tool taken from the direction of arrows IIIB—IIIB in FIG. 3A.

Alternatively, in the solenoid valve device 1 of FIG. 1 according to the first embodiment of the present invention, since the outside diameter of the flange 38 of the valve housing 31 is equal to or smaller than that of the tube portion 32, an open end of the yoke 11 cannot be crimped by the cylindrical crimping tool 130 as in the conventional example shown in FIG. 4. Therefore, as shown in FIG. 3B, a crimping tool 70 including a pair of half tools 71, is used with the solenoid valve device 1. With continued reference to FIG. 3A, inner wall surfaces 71a of the half tools 71 coming in contact with the yoke 11 are formed in an inclined shape. The half tools 71 crimp the open end of the yoke 11 from the side of the valve housing 31 into the flange 38 in a direction perpendicular to a longitudinal direction of the valve housing 31, in the manner indicated by the directional arrows in FIGS. 3A and 3B. An outer surface defining an annular recess portion 39 is formed on a side opposite the linear solenoid 10 with respect to the flange 38, and a diameter of the outer surface is smaller than the outside diameter of the flange 38. Therefore, circular ends 71b of the half tools 71 protrude into the annular recess portion 39, and the half tools 71 crimp the yoke without coming in contact with the valve housing 31.

Next, operation of the solenoid valve device 1 will be described with initial reference to FIG. 1. The spool 40 moves toward the spring 50, that is, downward in FIG. 1, when the coil 20 is energized, thereby causing the sealing length of the overlapped portion between the inner wall 31a and the large diameter land 42 to increase and the sealing length of the overlapped portion between the inner wall 31b and the large diameter land 41 to decrease. Therefore, an amount of a working oil flowing from the inlet port 33 to the outlet port 34 decreases, and an amount of a working oil flowing from the outlet port 34 to the discharge port 36 increases, so that an oil pressure of a working oil flowing out from the outlet port 34 decreases.

Alternatively, when the spool 40 moves toward the linear solenoid 10, the sealing length between the inner wall 31a and the large diameter land 42 decreases, and the sealing length between the inner wall 31b and the large diameter land 41 increases. Therefore, an amount of a working oil flowing from the inlet port 33 to the discharge port 36 decreases, so that an oil pressure of a working oil flowing out from the outlet port 34 increases.

With continued reference to FIG. 1, the linear solenoid 10 controls a force pressing against the spool 40. The force is transmitted in the direction of the spool by controlling a current supplied to the coil 20, thereby adjusting an oil pressure of a working oil that flows out of the outlet port 34. As the current supplied to the coil 20 is increased, an oil pressure of a working oil flowing out of the outlet port 34 is decreased. Therefore, the current supplied to the coil is inversely proportional to the oil pressure at the outlet port 34. The position of the spool 40 changes according to the current supplied to the coil 20, which ultimately adjusts an oil pressure of a working oil supplied to an automatic gear.

In the first embodiment, an outer diameter of the linear solenoid 10 is made to be substantially equal to or smaller than the outside diameter of the valve housing 31, so that the entire solenoid valve device 1 can be disposed within the cylindrical reception hole 61 provided in the body 60 (FIG. 2). Accordingly, no part of the solenoid valve device 1 protrudes out of the body 60, so the solenoid valve device 1 does not interfere with components external to the body 60. Further, since the entire solenoid valve device 1 can be disposed within the cylindrical reception hole 61, a step-shaped hole comprised of different hole diameters is not required, thereby decreasing the number of boring processes required within the reception hole 61.

Figure 5:
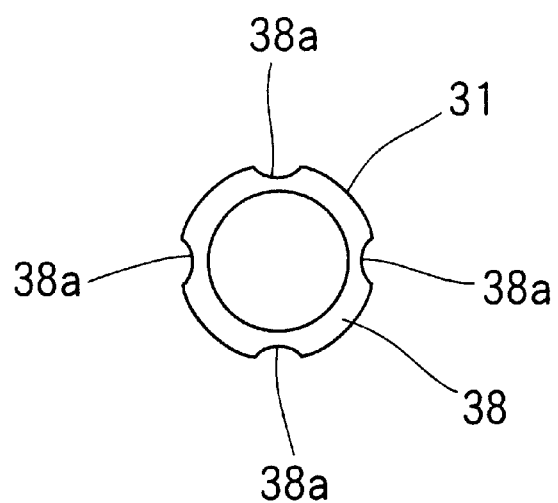
FIG. 5 is a schematic view showing a flange according to a second embodiment of the present invention.

A second embodiment of the present invention is shown in FIG. 5, and it will be explained with supplemental reference to FIG. 1. FIG. 5 shows a flange 38 viewed from a side of the linear solenoid 10. An outer circumferential surface of the flange 38 defines four recess portions 38a at 90-degree intervals. When the open end of the yoke 11 is crimped, the yoke 11 is deformed around its open end. These deformed portions of the yoke 11 enter the recess portions 38a, thereby preventing the entire yoke 11 from being deformed and the outer diameter of the yoke 11 from increasing. Furthermore, because the deformed portions of the yoke 11 enter the recess portions 38a of the flange 38, the yoke 11 is prevented from rotating relative to the valve housing 31.

Figure 6:
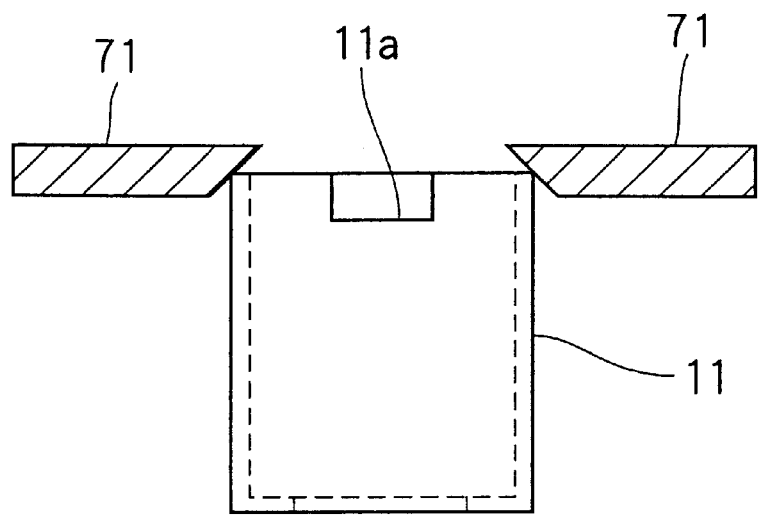
FIG. 6 is a schematic view showing a yoke according to a third embodiment of the present invention.

A third embodiment of the present invention is shown in FIG. 6. At least one notch 11a is provided on the open end of the yoke 11. When the open end of the yoke 11 is crimped by the half tools 71, the yoke 11 is deformed around its open end. This deformation of the yoke 11 is absorbed into the notch 11a, thereby preventing the entire yoke 11 from being deformed and the outer diameter of the yoke 11 from increasing.

Figure 7:
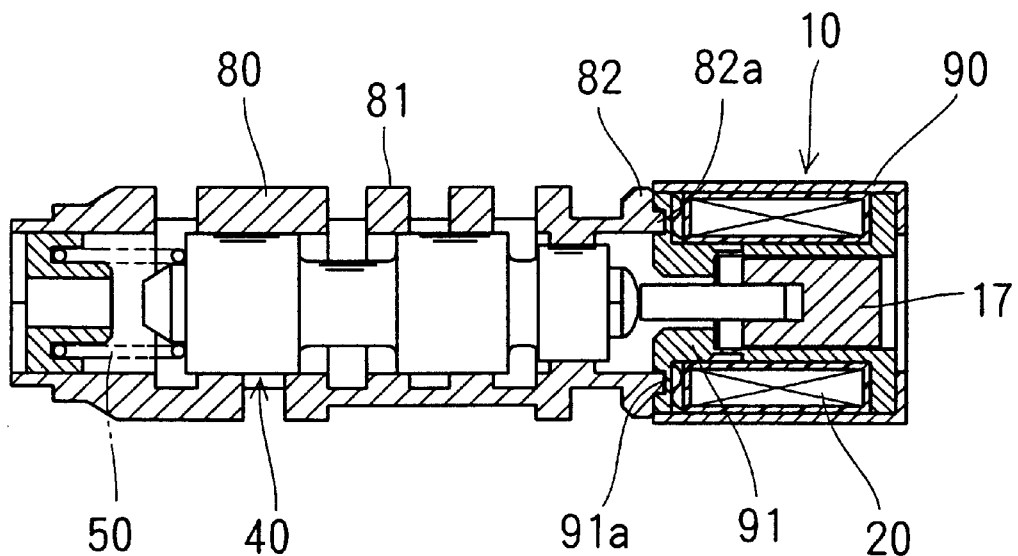
FIG. 7 is a cross-sectional view showing a solenoid valve device according to a fourth embodiment of the present invention.

A fourth embodiment of the present invention is shown in FIG. 7. Portions of the fourth embodiment substantially identical to those of the first embodiment are indicated by the same reference numerals. The outer diameter of the valve housing 80 is substantially equal to or smaller than the outer diameter of the linear solenoid 10. The flange 38 has an annular projection 82a protruding into the side of the linear solenoid 10. An annular recess portion 91a is provided on the stator core 91 at the side of the valve housing 80. The annular projection 82a of the flange 38 is press-fitted into the annular recess portion 91a of the stator core 91. The yoke 90 is press-fitted to the outside of the stator core 91.

Figure 8:
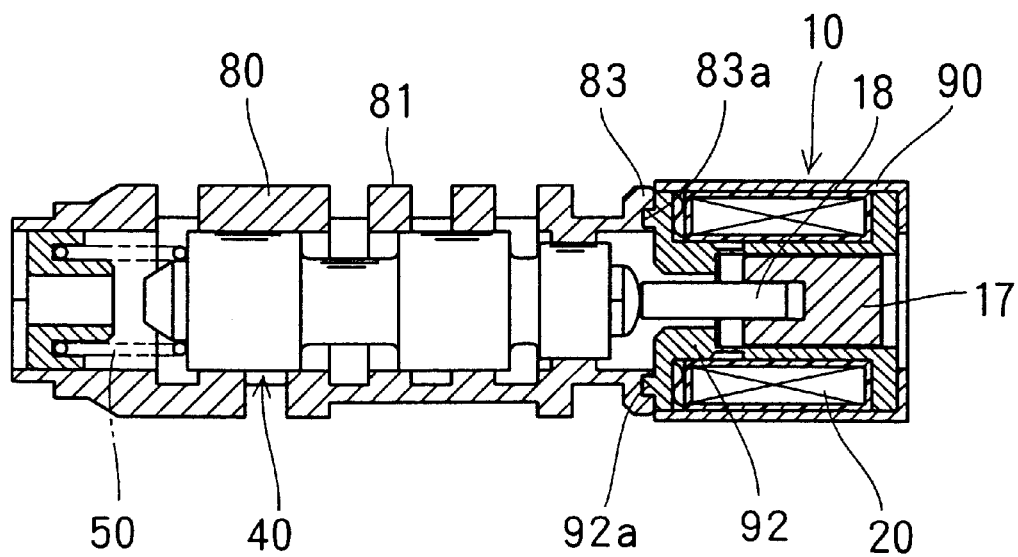
FIG. 8 is a cross-sectional view showing a solenoid valve device according to a fifth embodiment of the present invention.

A fifth embodiment of the present invention is shown in FIG. 8. Composition portions of the fifth embodiment substantially identical to those of the fourth embodiment are indicated by the same reference numerals. A flange 83 of a valve housing 80 has an annular recess portion 83a at the side of the linear solenoid 10. A stator core 92 has an annular projection 92a protruding into a side of the valve housing 80. The annular projection 92a of the stator core 92 is press-fitted to the annular recess portion 83a of the flange 83.

Figure 9:
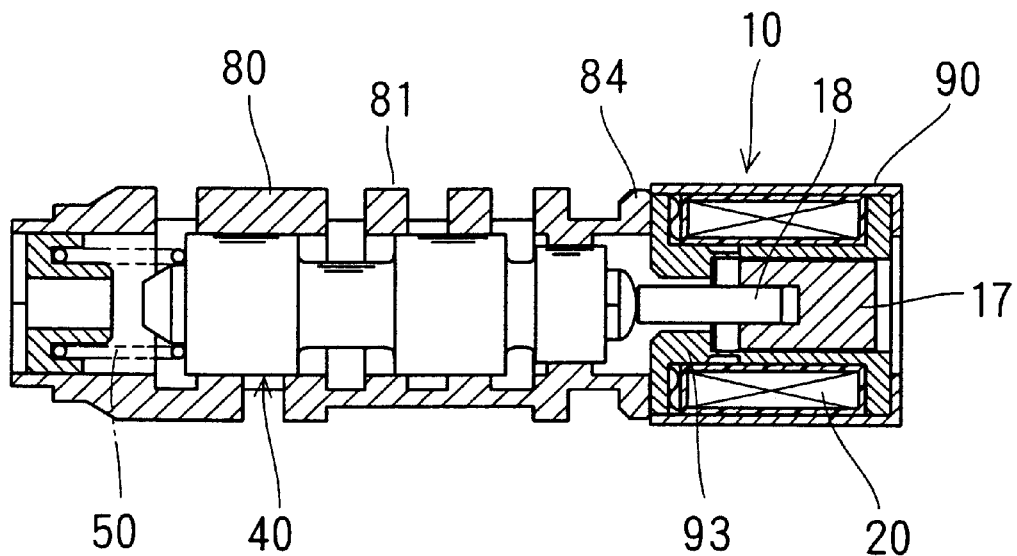
FIG. 9 is a cross-sectional view showing a solenoid valve device according to a sixth embodiment of the present invention.

A sixth embodiment of the present invention is shown in FIG. 9. Composition portions of the sixth embodiment substantially identical to those of the fourth embodiment are indicated by the same reference numerals. An end surface of a flange 84 of the valve housing 80 at the side of the linear solenoid 10 and an end surface of a stator core 93 at the side of the valve housing 80 are formed in a flat shape, and both end surfaces are connected to each other by adhesion or welding.

Figure 10:
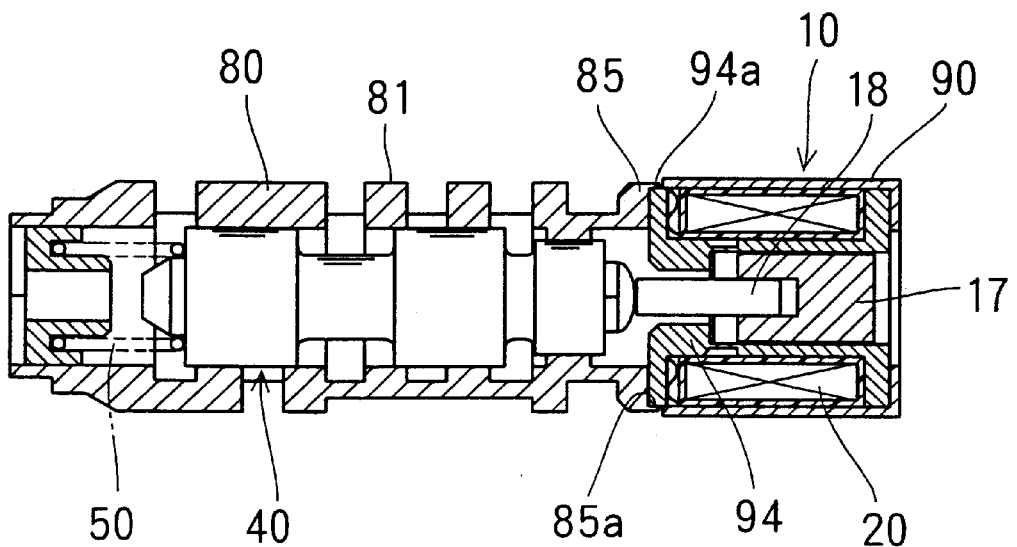
FIG. 10 is a cross-sectional view showing a solenoid valve device according to a seventh embodiment of the present invention.

A seventh embodiment of the present invention is shown in FIG. 10. Composition portions of the seventh embodiment substantially identical to those of the fourth embodiment are indicated by the same reference numerals. A flange 85 of the valve housing 80 has a female screw portion 85a. A stator core 94 has a male screw portion 94a on its outer circumferential end portion at the side of the valve housing 80. The female screw portion 85a of the flange 85 and the male screw portion 94a of the stator core 94 are joined so that the valve housing 80 and the stator core 94 are connected to each other.

In the above embodiments, since the outer diameter of the flange of the valve housing is substantially equal to or smaller than the outer diameter of the tube portion, the valve housing can be formed by cutting a base material having a smaller diameter than in the case where the outer diameter of the flange is larger than that of the tube portion of the valve housing, thereby resulting in a decrease of the material removed during manufacturing. Furthermore, through-feed cutting can be performed, resulting in a decrease of the cutting time.

In the above embodiments, the solenoid valve device according to the present invention is used as a hydraulic control valve for an automatic gear. However, the present invention and its embodiments can be applied to a solenoid valve device which is disposed in an engine head cover as a hydraulic control valve of a valve timing adjustment device. Further, the present invention can be applied to any flow controlling apparatus.

In the solenoid valve device of the above embodiments, with reference to FIG. 1, since a current supplied to the coil 20 is proportional to a displacement amount of the plunger 17 and the spool 40, an oil pressure at the outlet port 33 can be controlled by controlling the current. Additionally, the solenoid valve device according to the present invention may be applied to a switching valve for opening and closing a passage by energizing and de-energizing the coil of the electromagnetic driving portion.

What is claimed is:

1. A solenoid valve device comprising:
    a unitary valve housing including a plurality of openings through which an inside of a peripheral wall of the valve housing and an outside thereof communicate with each other;
    a valve member disposed within the valve housing, the valve member being generally cylindrical and being supported by the peripheral wall of the valve housing to freely reciprocate therein for controlling a communication state among the plurality of openings; and
    an electromagnetic driving portion for generating a driving force to displace the valve member;
    wherein an outer diameter of the electromagnetic driving portion is substantially equal to or smaller than an outer diameter of the valve housing,
    wherein the electromagnetic driving portion and the valve housing are constructed as an integrated assembly in which the electromagnetic driving portion is directly secured to an end of the valve housing.

2. The solenoid valve device according to claim 1, wherein a value of a current supplied to the electromagnetic driving portion is proportional to a displacement amount of the valve member.

3. The solenoid valve device according to claim 1, attached to a body of a hydraulic control apparatus for an automatic gear.

4. The solenoid valve device according to claim 3, wherein the outer diameter of the valve housing is equal to or smaller than an inside diameter of the body.

5. The solenoid valve device according to claim 1 for adjusting an oil pressure in a hydraulic chamber of a valve timing adjustment device for adjusting any one of an intake valve and a discharge valve.

6. The solenoid valve device according to claim 1, wherein:
    the valve housing includes a flange, to be connected to the electromagnetic driving portion, at its end and at a side of the electromagnetic driving portion;
    wherein an outer diameter of the flange is equal to or smaller than an outer diameter of the valve housing.

7. The solenoid valve device according to claim 6, wherein:
    the electromagnetic driving portion includes a yoke covering a coil;
    the valve housing includes an annular recess portion on its peripheral wall at an opposite side of the electromagnetic driving portion with respect to the flange; and
    an open end of the yoke at a side of the valve portion is crimped to the flange in a direction perpendicular to a longitudinal direction of the valve housing.

8. The solenoid valve device according to claim 7, wherein:
    at least one notch is provided circumferentially on the open end of the yoke at a side of the valve portion.

9. The solenoid valve device according to claim 7, wherein:
    at least one recess portion is provided circumferentially around the flange.

10. A solenoid valve device comprising:
    a valve housing having a tube portion including a plurality of openings through which an inside of the tube portion fluidly communicates with an outside of the tube portion;
    a valve member disposed within the tube portion for controlling a fluid between an interior of the tube portion and an exterior of the tube portion;

an electromagnetic driving portion for generating a driving force to displace the valve member;

an integral flange defined at a first end of the tube portion for connection to the electromagnetic driving portion; and a cylindrical shaped yoke that encompasses the electromagnetic driving portion, wherein the cylindrical shaped yoke has an outside diameter that is equal to or smaller than an outside diameter of the tube portion.

11. The solenoid valve device according to claim 10, wherein:

a first end of the valve housing with the flange abuts the electromagnetic driving portion so that the cylindrical shaped yoke surrounds a portion of the flange to create a single, joined piece.

12. The solenoid valve device according to claim 10, wherein:

an annular recess portion at the first end of the valve housing adjacent to the flange, is capable of accommodating a crimping tool, to facilitate crimping of the yoke around a portion of the flange.

13. The solenoid valve device according to claim 10, wherein:

the first end of the valve housing abuts a first end of the electromagnetic driving portion so that an annular projection on the end portion of the valve housing proximate to an inside diameter of the valve housing conforms to an annular recess of the stator core, thereby creating a single joined device so that the outside diameter of the yoke is equal to or less than the outside diameter of the valve housing.

14. The solenoid valve device according to claim 10, wherein:

the first end of the valve housing abuts a first end of the electromagnetic driving portion so that an annular projection of the electromagnetic driving portion inserts into an annular recess of the valve housing, thereby creating a single, joined device where the outside diameter of the yoke is equal to or less than the outside diameter of the valve housing.

15. The solenoid valve device according to claim 10, wherein:

the first end of the valve housing abuts a first end of the electromagnetic driving portion so that the flange can be adhered to or welded to a stator core of the electromagnetic driving portion so that the outside diameter of the yoke is equal to or smaller than the outside diameter of the valve housing.

16. The solenoid valve device according to claim 10, wherein:

the first end of the valve housing abuts a first end of the electromagnetic driving portion;

wherein the flange of the valve housing comprises a female screw portion and the electromagnetic driving portion has a stator core with a male screw portion, so that the male screw portion of the stator core and the female screw portion of the flange are connectable so that the valve housing and the stator core form a connected piece.

17. A solenoid valve device as in claim 10, wherein said integral flange is directly connected to the electromagnetic driving portion.

* * * * *